(12) United States Patent
Blasco Claret et al.

(10) Patent No.: US 8,274,341 B2
(45) Date of Patent: *Sep. 25, 2012

(54) DEVICE FOR INDUCTIVE MULTI-INJECTION ON MULTIPLE CONDUCTORS

(75) Inventors: Jorge Vicente Blasco Claret, Valencia (ES); Jose Luis Gonzalez Moreno, Xirivella (ES); Jose Maria Vidal Ros, Valencia (ES)

(73) Assignee: Marvell Hispania, S.L.U., Madrid (ES)

( * ) Notice: Subject to any disclaimer, the term of this patent is extended or adjusted under 35 U.S.C. 154(b) by 48 days.

This patent is subject to a terminal disclaimer.

(21) Appl. No.: 13/007,102

(22) Filed: Jan. 14, 2011

(65) Prior Publication Data
US 2011/0109399 A1 May 12, 2011

Related U.S. Application Data

(63) Continuation of application No. 12/681,463, filed as application No. PCT/ES2008/000610 on Sep. 26, 2008.

(30) Foreign Application Priority Data
Oct. 2, 2007 (ES) .................... 200702566

(51) Int. Cl.
*H03H 2/00* (2006.01)
*H01F 27/28* (2006.01)
(52) U.S. Cl. ..................... 333/24 R; 336/171

(58) Field of Classification Search ........... 333/24 R, 333/1; 336/170, 171; 365/130, 158
See application file for complete search history.

(56) References Cited

U.S. PATENT DOCUMENTS

| 3,566,373 | A  | * | 2/1971 | Shackell ..................... 365/97 |
| 4,328,564 | A  | * | 5/1982 | Pryor ............................ 365/130 |
| 5,587,943 | A  | * | 12/1996 | Torok et al. ................... 365/158 |
| 6,906,947 | B2 | * | 6/2005 | Bloomquist et al. ........... 365/158 |
| 7,002,333 | B2 | * | 2/2006 | Blasco Claret et al. ....... 323/356 |
| 7,116,575 | B1 | * | 10/2006 | Katti .............................. 365/158 |
| 7,120,048 | B2 | * | 10/2006 | Sundstrom .................... 365/158 |
| 2010/0289595 | A1 | * | 11/2010 | Blasco Claret et al. ........... 333/1 |

FOREIGN PATENT DOCUMENTS

| CA | 2532061 A1 | 1/2005 |
| WO | WO 03/063381 A1 | 7/2003 |

OTHER PUBLICATIONS

Pang, T.S., So, P.L., See, K.Y., and Kamarul, A.; Common-Mode Current Propagation in Power Line Communication Networks Using Multi-Conductor Transmission Line Theory; pp. 517-522; Mar. 26-28, 2007.

* cited by examiner

Primary Examiner — Dean O Takaoka

(57) ABSTRACT

The techniques described herein permit the application of methods for increasing the performance of a communications system on a medium made up of N conductors and a reference plane by means of injecting signals inductively in up to N combinations of the conductors, including injection in common mode, such that said injected signals can be made to be orthogonal to each other.

22 Claims, 4 Drawing Sheets

DEVICE FOR INDUCTIVE MULTI-INJECTION ON MULTIPLE CONDUCTORS

CROSS-REFERENCE TO RELATED APPLICATIONS

This application is a continuation of U.S. patent application Ser. No. 12/681,463, filed on Jul. 23, 2010, which claims the benefit of International Application No. PCT/ES08/00610, filed Sep. 26, 2008, which claims the benefit of Spanish Application No. P200702566, filed Oct. 2, 2007. The disclosures of the above applications are incorporated herein by reference in their entirety.

FIELD

The present disclosure relates to a device for inductive multi-injection on multiple conductors.

In any communications system one aims to exploit as much as possible the characteristics of a communications medium in order to achieve the maximum transmission capacity, reliability, coverage, etc. In the case of a communications medium being made up of multiple conductors it is possible to use those conductors in order to achieve one or several of these objectives. There exist methods in the state of the art both for enhancing the quality of the communication and for increasing the reutilization of frequencies, among other applications, however they need the signals to be injected properly in order to be able to do this.

The present invention reveals a device specially designed for performing inductive multi-injection on multiple conductors such that it becomes easier to implement methods for increasing the quality of the communications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Communications systems need a transmission medium for the signals, which transmission medium is very often made up of multiple conductors. The presence of these multiple conductors can be exploited in order to enhance various features of the communications system, such as the transmission capacity or immunity to noise, among others. One of the ways of exploiting a multi-conductor medium is to use orthogonal modes, for which it is necessary to inject signals in that medium in the right way; this can be done inductively or in voltage.

The device of the invention is designed for being able to apply the method specified in Spanish Application No. 200702256 relating to a "Method for increasing the performance of a communications system on a medium made up of multiple conductors", injecting the signals in the multi-conductor medium inductively. As occurred in this patent, the description of the inventive device uses various conventional concepts which are commented on below. "Mode" is understood to be the injection of voltage or current on a selective combination of conductors, reference plane or both. Likewise, "orthogonal multi-injection" is defined as being an injection of multiple modes orthogonal to each other. The injection modes are divided into a common mode, differential modes, and pseudo-differential modes. The common mode is that which causes circulation of currents via the reference plane. The differential modes consist of injection by a conductor and collection of the return via the other, while the pseudo-differential modes consist of injection of voltage or current between one or more conductors and return via one or more conductors different from those used for the injection, the number of conductors used in this case being greater than two.

There exists in the state of the art some patents with methods intended to increase the performance of a communications system when the medium is a multi-conductor which leave unsolved the problem of carrying out the injection in that medium. The inventive device solves this shortcoming and focuses on the specific way of carrying out inductive injection on that medium in order to achieve orthogonality among the injections; it therefore solves the stated problem and as a consequence it is not anticipated by the documents existing in the state of the art.

Moreover, the state of the art also contains patents on inductive couplers, but which do not anticipate the present invention. One of these patents is document WO-03/063381-A1 known as "Coupling device", which describes an inductive method of coupling for zones where it is necessary to inject on different branches of the electrical network and where those injections are carried out differentially on two conductors of each branch. Given that, with the method described, it is not possible to carry out orthogonal multi-injection on multiple conductors with injections in common, differential and pseudo-differential mode, said patent being referred to does not anticipate the inventive device.

SUMMARY

In order to achieve the objectives and avoid the drawbacks stated in previous sections, the invention consists of a device for inductive multi-injection on multiple conductors which permits the application of methods for increasing the performance of a communications system on a medium made up of N conductors and a reference plane. Said device is made up of the following elements and connections: E signal inputs, where E is between 1 and N, for each one of the signals to inject between the conductors; A inductive couplers, A being equal to or greater than twice the number of signal inputs (2×E), where the specific number of inductive couplers used in the device depends on the number of injection modes and on the number of conductors used by each of those modes, and in which the conductor passes through the gap in the inductive coupler on one or more occasions; E signal injection loops, each one of which injects in a differential mode, pseudo-differential mode or common mode, which pass through the couplers located around the conductors on which said loop is going to inject current, and the direction in which the loop traverses each inductive coupler determines the direction of the current it is wished to inject in the conductor; and the number of turns of each injection loop on each coupler or of each conductor on each coupler is such that injections are achieved in differential mode, pseudo-differential mode or common mode. Thanks to the device, it is possible to inject communications signals in up to N combinations of the conductors in such a way that said signals injected are orthogonal to each other.

In this device the signal inputs that are injected in differential mode or pseudo-differential mode are balanced and are connected to the two ends of each loop, while the signal input that is injected in common mode is referred to the reference plane and connected to one of the ends of the loop used for injection in common mode, the other end of the loop being connected to the reference plane.

The inductive couplers used in the device are elements with high magnetic permeability such as nanocrystalline materials or ferromagnetic ceramic materials, and whose shape allows them to be traversed by the conductors and by the loops.

In an embodiment of the inventive device, the number of couplers is equal to the number of conductors used by the different injections, such that all the injections that apply current in a conductor will use the inductive coupler associated with that conductor.

In this case, each conductor will only traverse the coupler associated with it once, while the injection loops will traverse that coupler as many times as necessary for maintaining a suitable ratio of currents for achieving orthogonal injections.

In another alternative embodiment of the device, the number of couplers is equal to the number of injection modes used, such that each injection mode has a single coupler associated with it.

In this case, each coupler is traversed by a single loop once only, while conductors used by the injection mode associated with the coupler traverse that coupler as many times as necessary for maintaining a suitable ratio of currents for achieving orthogonal injections.

Finally, although the inventive device can be used in any multi-conductor medium, it is specifically developed for the case in which the communications channel made up of multiple conductors is the electrical network.

Below, in order to facilitate a better understanding of this descriptive specification and forming an integral part thereof, some figures are attached in which objects of the invention have been represented by way of illustration and are non-limiting.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
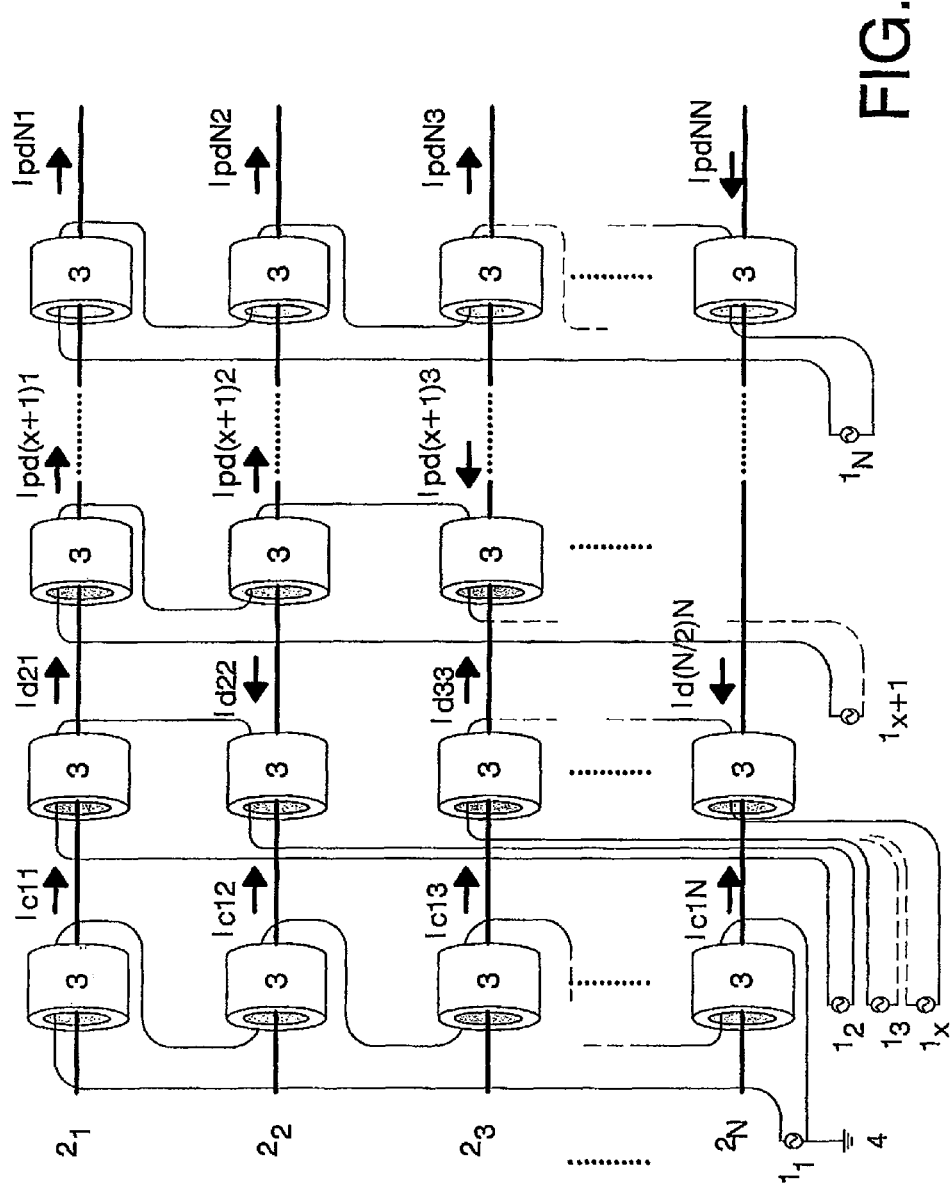
FIG. 1 is an example of the multi-injection device with N signals on N conductors with their different elements and connections.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

Given below is a description of various examples of embodiment of the invention, with reference to the numbering adopted in the figures.

Theoretically, it is possible to use the property that the transmission medium is made up of multiple conductors in order to successfully maximize the performance of a communications system using that transmission medium. In fact, it is possible to achieve a method that distributes the currents in a multi-conductor medium in such a way that the signals are injected orthogonally into that medium, with which a lower level of interference among injections, greater coverage, etc., are achieved. The main problem of these methods is the injection of the signals in the multi-conductor medium.

The inventive device is capable of carrying out that inductive injection optimally in order to follow the desired method for increasing the communication capacities of a system which uses that multi-conductor medium.

FIG. 1 represents an example of embodiment in which is shown a channel of N conductors referred to a reference plane (4) where N injections are carried out by means of the inductive multi-injection device. In this example, there is an even number of N conductors ($2_1$ to $2_N$) and N input signals ($1_1$ to $1_N$) which are divided into a signal that will be injected in common mode ($1_1$), multiple signals that will be injected in differential mode ($1_2$ to $1_x$) and multiple signals that will be injected in pseudo-differential mode ($1_{x+1}$ to $1_N$). Likewise, in this example of embodiment there is an inductive coupler (3) for each conductor and injection used. In order to achieve orthogonal injections the conductors where the signals are injected, the direction of the injected current and the number of turns of the injection loop will be the appropriate ones according to the method for increasing the performance of the characteristics of the communication used.

As can be seen in the above figure, the injection in common mode has its return via the reference plane (4), while the differential and pseudo-differential modes create currents solely on the conductors ($2_1$ to $2_N$).

The number of maximum differential modes depends on the number of conductors, being N/2 for an even number of conductors and (N−1)/2 for an odd number.

In order to aid an understanding of FIG. 1, the currents that have been drawn on the different conductors have three subscripts. The first indicates whether it is common mode (c), differential mode (d) or pseudo-differential mode (pd); the second is the number of the injected signal (which goes from 1 to N); and the third is the number of the conductor via which the current is distributed (which also goes from 1 to N in this example).

Figure 2:
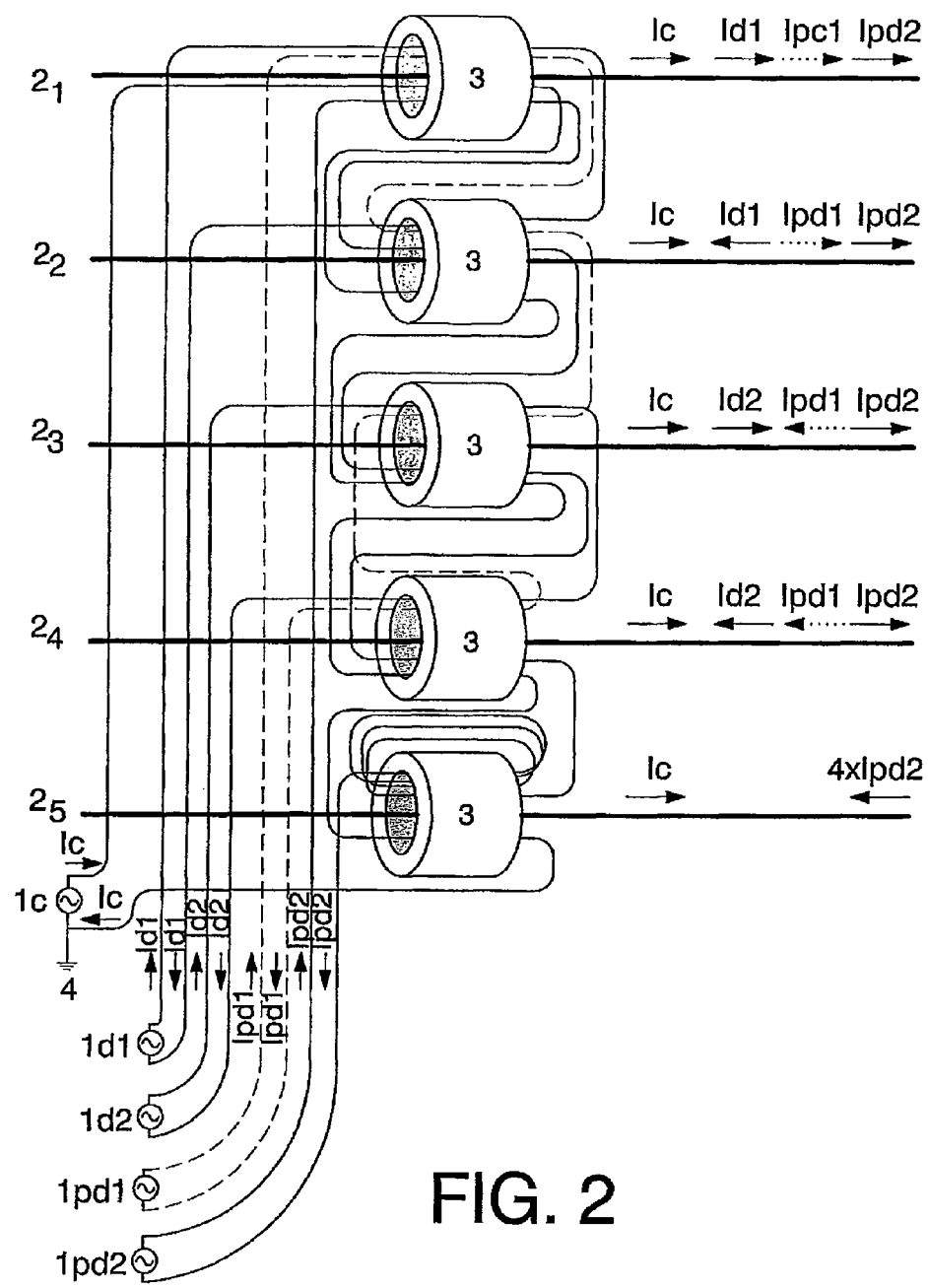
FIG. 2 represents an embodiment of the invention in which each conductor is associated with a single inductive coupler.

Another example of embodiment can be seen in FIG. 2, where the device is shown on a channel made up of five conductors ($2_1$ to $2_5$) referred to a reference plane (4). In this case, just one coupler (3) is used for each conductor, which drastically reduces the number of inductive couplers used. Each one of the injection modes that need to couple a signal in a particular conductor will have to use the coupler for that conductor. This means that several injection loops of different modes can pass on the same coupler enveloping a conductor. The conductors (2) only pass once through their inductive coupler (3) but the injection loops will pass through the coupler as many times as necessary in order to guarantee the coupling proportion that grants the characteristics of orthogonality among the injected modes, and which will be determined by the method of increasing performance used on the inventive device.

In FIG. 2 the inputs have been drawn that are going to be coupled in common mode ($1_c$), in differential mode ($1_{d1}$ and $1_{d2}$) and in pseudo-differential mode ($1_{pd1}$ and $1_{pd2}$). These inputs produce currents that will be coupled in common mode ($I_c$), in differential mode ($I_{d1}$ and $I_{d2}$) and in pseudo-differential mode ($I_{pd1}$ and $I_{pd2}$). The loops that carry the signals between the different couplers must be such that orthogonality of signals is produced, according to the method used on the device. In this case, the loop of the second pseudo-differential coupling has to give four turns to the coupler (3) located in the lowest conductor ($2_5$) in order to obtain the right value of current on that conductor. The condition of orthogonality of the injections on the conductors determines the direction of the injected currents and the number of turns of the injection loop or of each conductor via the inductive couplers. The equivalent electrical model of each inductive coupling corresponds to a transformer with one or more shared windings or not, where the windings will on the one hand be the injection loops and on the other hand the conductors. Assuming the condition of adaptation of impedances, the distribution of currents of each coupling in the conductors that can be seen in FIG. 2 takes place.

Figure 3:
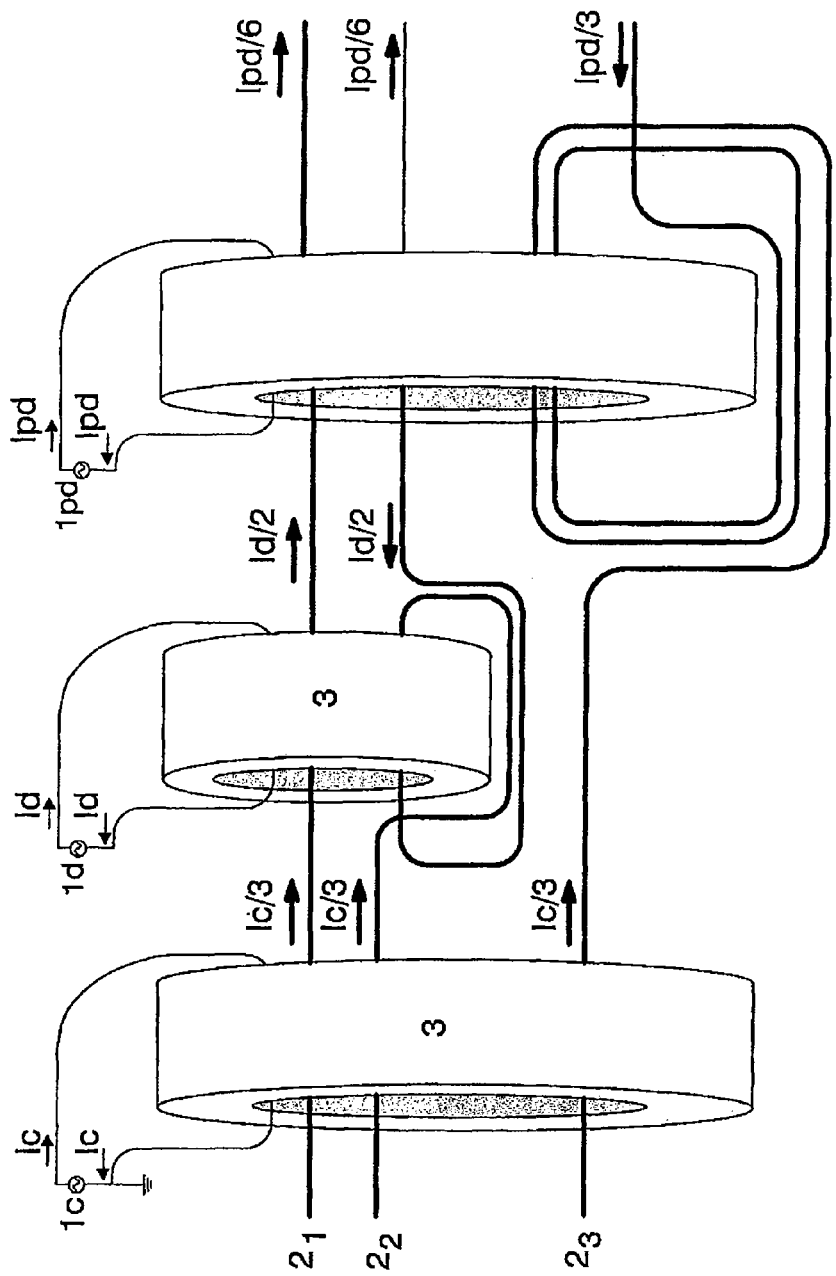
FIG. 3 shows an embodiment of the invention in which each injection mode is associated with a single inductive coupler.

Moreover, FIG. 3, shows another embodiment of inductive coupling in the inventive device, where each injection mode has a single coupler (3) associated with it, via which pass the conductors on which the mode has to couple the signal. In this case there are three conductors ($2_1$, $2_2$ and $2_3$) on which there are going to be injected a common mode signal ($1_c$), a differential mode signal ($1_d$) and another in pseudo-differential mode ($1_{pd}$). These input signals will produce corresponding currents ($I_c$, $I_d$ and $I_{pd}$) which will be coupled inductively to the conductors.

In this example of embodiment, it is the conductors which traverse the inductive couplers (3) with the appropriate number of turns and in the right direction for guaranteeing the property of orthogonality in the signals between the different conductors (2). The injection loops, on the other hand, will only pass through their inductive coupling once. The figure shows an embodiment on a total of three conductors where up to three orthogonal injection modes are possible. In this case, as shown in FIG. 3, the distribution of currents could be $I_c/3$ per conductor for the common mode current, $I_d/2$ per conductor for the differential mode current and $I_{pd}/3$ or $I_{pd}/6$ per conductor for the pseudo-differential mode currents.

Figure 4:
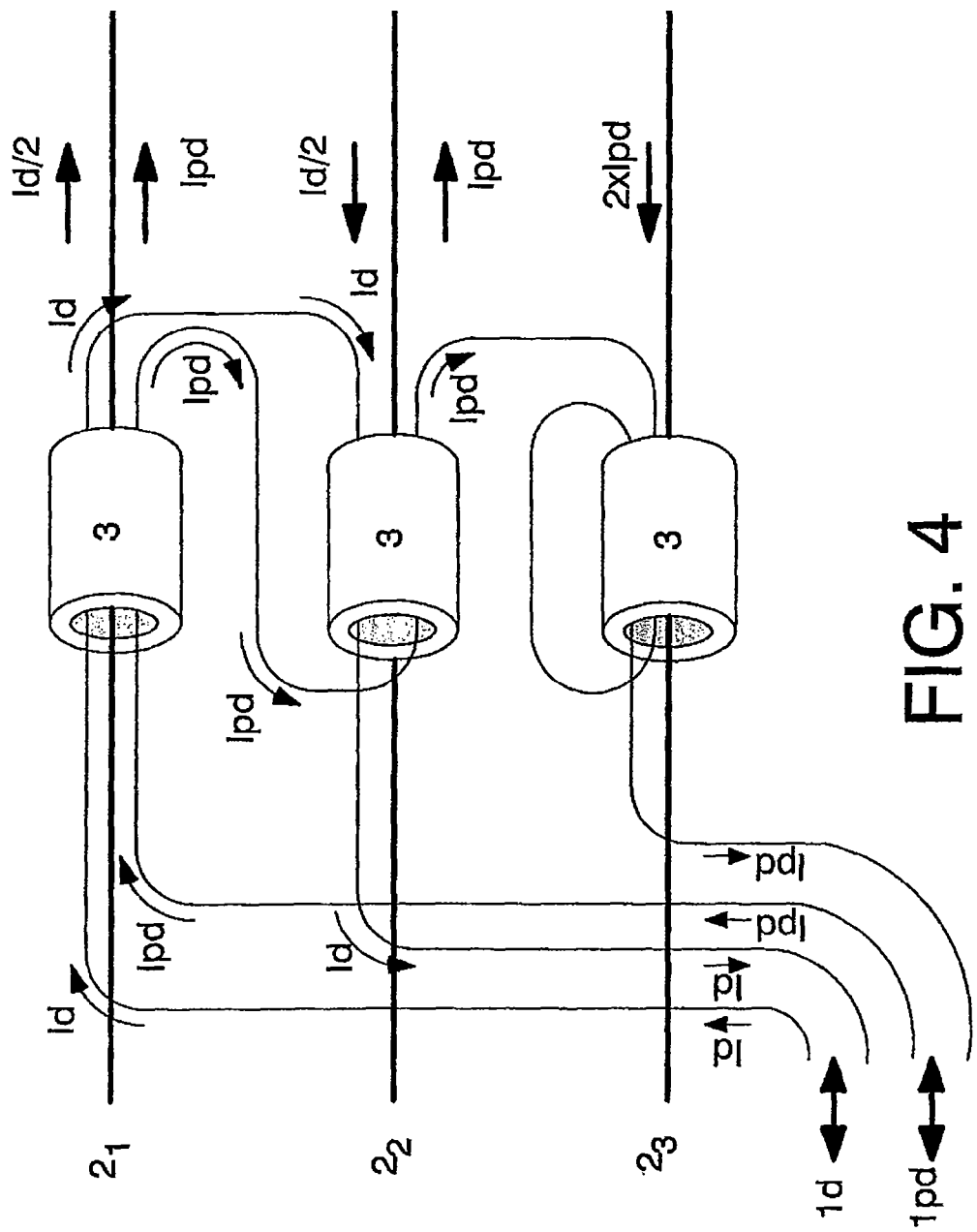
FIG. 4 represents an example of embodiment in a medium with three conductors in which just two injections are carried out, a differential injection and another pseudo-differential one.

Finally, FIG. 4 shows an example of embodiment on a channel of three conductors ($2_1$, $2_2$ and $2_3$) where just the inductive couplings of the differential and pseudo-differential modes have been implemented. In general, the common mode displays higher signal losses and greater interference from radiation, and so it is not normally used in real implementations in order to comply with standards and the different international regulations on radiation.

In this case, there will be two signal inputs, one which will be injected in differential mode ($1_d$) and the other in pseudo-differential mode ($1_{pd}$), which will generate their corresponding currents ($I_p$ and $I_{pd}$). Each conductor has its own coupler (3) such that the conductors ($2_1$, $2_2$, $2_3$) only traverse the coupler once, while the loops which connect with the signal inputs have to traverse the loop the appropriate number of times and in the right direction for achieving orthogonality among the injections.

Specifically, the differential loop traverses the coupler (3) of the upper conductor ($2_1$) in the forward direction and the coupler (3) of the middle conductor ($2_2$) in the reverse direction, with which half the differential current ($I_d/2$) is generated in opposing directions in the two conductors ($2_1$ and $2_2$). The pseudo-differential loop, on the other hand, traverses the couplers (3) of the upper conductor ($2_1$) and intermediate conductor ($2_2$) in the forward direction, and the coupler (3) of the lower conductor ($2_3$) in the reverse direction giving two turns. Thanks to this, a pseudo-differential current($I_{pd}$) is generated in the forward direction in the upper conductor ($2_1$) and middle conductor ($2_2$) and double in the opposite direction ($2 \times 1_{pd}$) in the lower conductor ($2_3$). It can be proven theoretically that injections of this form that are made are orthogonal, $I_{pd1}$ and $I_{pd2}$.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A device comprising: A inductive couplers, where A is an integer greater than 1; N conductors that extend through the A inductive couplers, where N is an integer greater than 1; and E signal lines configured to respectively receive E input signals, where E is an integer less than or equal to N, wherein the E signal lines loop through the A inductive couplers such that a first one of the A inductive couplers is configured to inject a first input signal on a first one of the N conductors during a differential mode, a second one of the A inductive couplers is configured to inject one of the first input signal and a second input signal on a second one of the N conductors during the differential mode, and at least one of the A inductive couplers is configured to inject a third input signal on at least two of the N conductors during a pseudo-differential mode.

2. The device of claim 1, wherein each of at least two of the E signal lines loop through the A inductive couplers E times, where A is equal to E multiplied by 2.

3. The device of claim 1, wherein:
the at least one of the A inductive couplers includes a third inductive coupler; and
the third inductive coupler is configured to inject the third input signal on the at least two of the N conductors during the pseudo-differential mode.

4. The device of claim 1, wherein the at least one of the A inductive couplers comprises:
a first inductive coupler configured to induce current on the first one of the N conductors; and
a second inductive coupler configured to induce current on the second one of the N conductors.

5. The device of claim 1, wherein:
the A inductive couplers are configured to operate in a common mode, the differential mode and in the pseudo-differential mode;
a first source of a first one of the E input signal lines includes a return port that is connected to a ground reference, wherein the first source injects a fourth input signal during the common mode;
a second source of a second one of the E input signal lines includes a return port that is not connected to the ground reference, wherein the second source injects one of the first input signal and the second input signal during the differential mode; and
a third source of a third one of the E input signal lines includes a return port that is not connected to the ground reference, wherein the third source injects the third input signal during the pseudo-differential mode.

6. The device of claim 1, wherein:
one of the E signal lines extends through each of a plurality of the A inductive couplers once and in a same direction to induce current in the N conductors during a common mode; and the plurality of the A inductive couplers are on different ones of the N conductors.

7. The device of claim 1, wherein:
one of the E signal lines extends through a first one of the A inductive couplers to induce current (i) on a first conductor, (ii) in a first direction and (iii) during the differential mode; and
the one of the E signal lines extends through a second one of the A inductive couplers in a second direction to induce current (i) on a second conductor and (ii) in a direction opposite the first direction.

8. The device of claim 1, wherein:
a first one of the E signal lines extends through a first one of the A inductive couplers to induce current (i) in a first direction on a first conductor of the N conductors and (ii) during the pseudo-differential mode;
a second one of the E signal lines extends through a second one of the A inductive couplers to induce current (i) in the first direction on a second conductor of the N conductors and (ii) during the pseudo-differential mode; and
a third one of the E signal lines extends through a third one of the A inductive couplers to induce current (i) in a second direction that is opposite the first direction on a third conductor of the N conductors and (ii) during the pseudo-differential mode.

9. The device of claim 1, wherein each of the N conductors extends through at least two of the A inductive couplers.

10. The device of claim 1, wherein one of the E signal lines extends through the A inductive couplers such that two or more of the A inductive couplers are configured to inject a fourth input signal on two or more of the N conductors during a common mode.

11. The device of claim 10, wherein:
the A inductive couplers are configured to inject the fourth input signal on at least four of the N conductors, wherein the at least four of the N conductors include a first conductor, a second conductor, a third conductor and a fourth conductor;
the first one of the A inductive couplers is configured to inject the first input signal on the first conductor;
the second one of the A inductive couplers is configured to inject the first input signal on the second conductor;
a third one of the A inductive couplers is configured to inject the fourth input signal on the third conductor; and
a fourth one of the A inductive couplers is configured to inject the fourth input signal on the fourth conductor.

12. The device of claim 1, further comprising the N conductors, where A is equal to N, and wherein each of the A inductive couplers operate in a common mode, the differential mode and in the pseudo-differential mode.

13. The device of claim 12, wherein one of the A inductive couplers has more input signal loops than another one of the inductive couplers.

14. The device of claim 1, wherein:
the A inductive couplers comprise N inductive couplers on respective ones of the N conductors;
the E input signal lines comprises N input signal lines, wherein each of the N input signal lines extends through a respective one of the N inductive couplers; and
each of the N inductive couplers is configured to operate (i) in a different mode and (ii) in one of a common mode, the differential mode and the pseudo-differential mode.

15. The device of claim 14, wherein one of the N conductors extends through fewer ones of the N inductive couplers than a second one of the N conductors.

16. The device of claim 14, wherein:
the first one of the N conductors (i) extends through each of the N inductive couplers and (ii) does not include a loop;
the second one of the N conductors (i) extends through each of the N inductive couplers and (ii) loops through the second one of the N inductive couplers; and
a third one of the N conductors (i) extends through N−1 of the inductive couplers and (ii) loops through a third one of the N inductive couplers.

17. The device of claim 1, wherein:
the A inductive couplers comprise N inductive couplers on respective ones of the N conductors;
the E input signal lines comprise N−1 input signal lines;
a first one of the N−1 input signal lines extends in different directions through two of the N inductive couplers to inject current in two of the N conductors during the differential mode; and
a second one of the N−1 input signal lines extends through (i) each of the N inductive couplers, (ii) two of the N inductive couplers in a first direction, (iii) one of the N inductive couplers in a second direction that is opposite the first direction, wherein the second one of the N−1 input signal lines extends through each of the N inductive couplers to inject current in each of the N conductors during the pseudo-differential mode.

18. The device of claim 17, wherein the N inductive couplers (i) operate in the differential mode and the pseudo-differential mode and (ii) do not operate in a common mode.

19. The device of claim 1, wherein the E signal lines comprise E signal injection loops, wherein inputs of the E signal injection loops (i) are balanced, (ii) operate in different modes and (ii) operate in one of a common mode, the differential mode and the pseudo-differential mode.

20. The device of claim 19, wherein:
each of the N conductors transverses a respective one of the A inductive couplers once; and
each of the E signal injection loops traverse a respective one of the A inductive couplers at least once to maintain a current ratio for orthogonal current injection.

21. The device of claim 1, wherein:
each of the A inductive couplers operates in a single mode;
the A inductive couplers operate in different modes; and
A is equal to 3.

22. The device of claim 1, wherein:
the E signal lines comprise E signal injection loops;
each of the A inductive couplers is traversed once by one of the E signal injection loops; and
the N conductors traverse each of the A inductive couplers at least once to maintain a current ratio for orthogonal current injection.

* * * * *